United States Patent
Fritze et al.

(10) Patent No.: US 6,843,512 B2
(45) Date of Patent: Jan. 18, 2005

(54) TUBING CONNECTOR

(75) Inventors: Karl Fritze, Denmark Township, MN (US); Brian D. Gale, Blaine, MN (US)

(73) Assignee: CUNO Incorporated, Meriden, CT (US)

(*) Notice: Subject to any disclaimer, the term of this patent is extended or adjusted under 35 U.S.C. 154(b) by 0 days.

(21) Appl. No.: 10/167,046

(22) Filed: Jun. 11, 2002

(65) Prior Publication Data

US 2003/0227169 A1 Dec. 11, 2003

(51) Int. Cl.[7] .................................................. F16L 21/06
(52) U.S. Cl. ...................... 285/322; 285/330; 29/890.14
(58) Field of Search ................................. 285/322, 330, 285/374, 382, 331; 29/890.14

(56) References Cited

U.S. PATENT DOCUMENTS

| | | |
|---|---|---|
| 3,884,513 A | 5/1975 | Gassert |
| 3,999,783 A | 12/1976 | Legris |
| 4,005,883 A | 2/1977 | Guest |
| 4,178,023 A | 12/1979 | Guest |
| 4,220,361 A | 9/1980 | Brandenberg |
| 4,606,783 A | 8/1986 | Guest |
| 4,650,529 A | 3/1987 | Guest |
| 4,722,560 A | 2/1988 | Guest |
| 4,946,213 A | 8/1990 | Guest |
| 5,230,539 A | 7/1993 | Olson |
| 5,564,757 A | 10/1996 | Seabra |
| 5,584,513 A | 12/1996 | Sweeny |
| 5,607,193 A | 3/1997 | Guest |
| 5,683,120 A | 11/1997 | Brock |
| 5,775,742 A | 7/1998 | Guest |
| 5,887,911 A | 3/1999 | Kargula |
| 5,909,902 A | 6/1999 | Seabra |
| 6,065,779 A | 5/2000 | Moner |
| 6,145,894 A | 11/2000 | Myers |
| 6,224,117 B1 | 5/2001 | Olson |
| 6,276,728 B1 | 8/2001 | Treichel |
| 6,302,451 B1 | 10/2001 | Olson |
| 6,334,634 B1 | 1/2002 | Osterkil |
| 6,390,511 B1 | 5/2002 | Kargula |

*Primary Examiner*—David Bochna
(74) *Attorney, Agent, or Firm*—R. Thomas Payne; John A. Tomich; Patterson, Thuente, Skaar & Christensen, PA

(57) ABSTRACT

A connector for connecting plastic tubing includes a receiver having a captured ring seal, the ring seal for compressively forming a fluid seal when in engagement with the plastic tubing; and a plurality of inward directed angled fingers disposed in the receiver for compressively engaging the tubing, a force being exertable by the fingers on the tubing, the force acting to resist withdrawal of the tubing from engagement with the fingers. A method of connecting is further included.

15 Claims, 4 Drawing Sheets

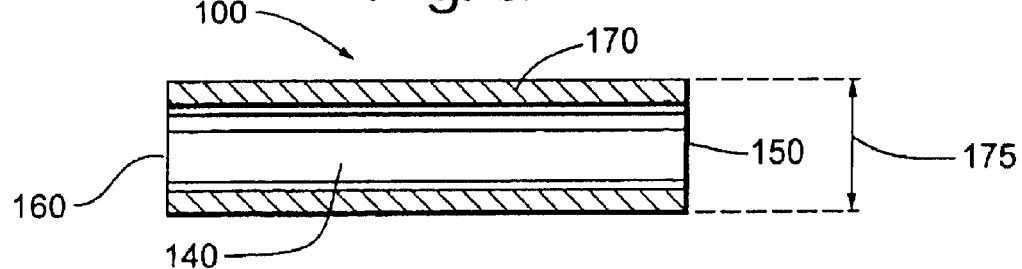
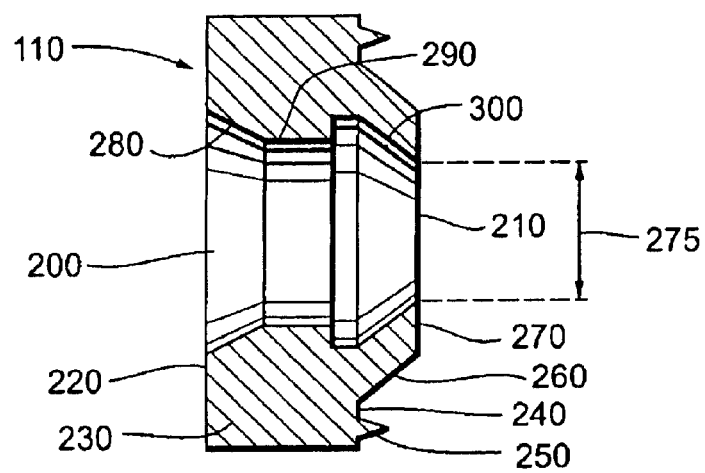
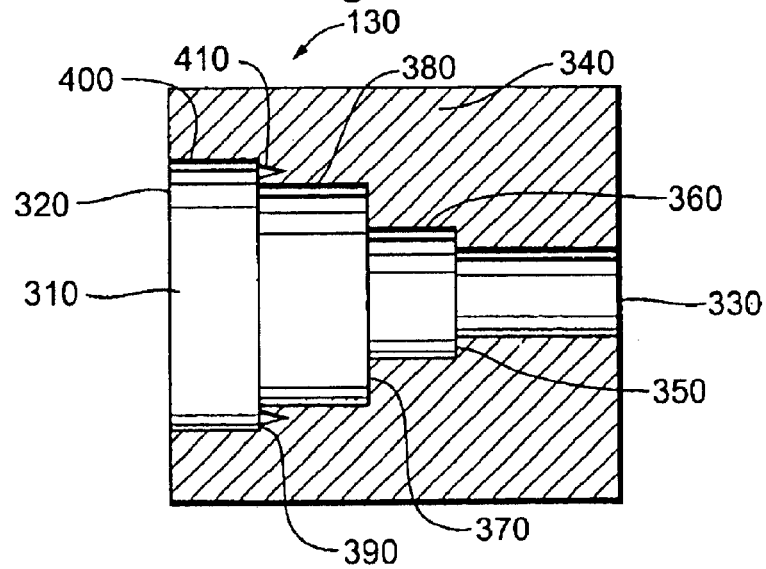

TUBING CONNECTOR

FIELD OF THE INVENTION

The present invention relates generally to the field of plastic tubing connectors. More specifically, the present invention relates to a push-style tubing connector.

BACKGROUND OF THE INVENTION

Since its invention, plastic tubing has increasingly been used in residential, commercial and industrial applications that were previously the domain of brass, copper and steel tubing. Plastic tubing offers many advantages over its metal predecessors. Plastic tubing is extremely flexible allowing for quick and easy installation as compared to metal tubing. In the case of demanding applications, the wide variety of available plastic polymers allows a user to select chemically inert and resistant tubing to meet the unique requirements of their application. Finally, nearly anyone can install plastic tubing as it does not require the skill set that typical metal tubing installations require.

A variety of methods have been developed for creating joints with plastic tubing. Most methods involve mechanical couplings providing temporary connections. Because the typical mechanical connection functions only due to a temporary mechanical seal, the potential for leaking is present when using such connections. Examples of these types of mechanical connections include the use of ferrules with a crimp process, push-style fittings such as those manufactured by John Guest International Ltd. and threaded style compression fittings such as those manufactured by JACO Manufacturing Company.

When users confront demanding applications, users typically select the appropriate tubing based on the polymer which best provides characteristics for their application. Many users will select specialty plastic polymers such as Polyvinylidene Fluoride (PVDF), Teflon® and cross-linked Polyethylene (PEX) when the demands of the application requires concern for chemical compatibility or elevated temperature issues. Unfortunately, many of the characteristics which make the use of specialty plastics desirable also lead to difficulties when a user attempts to create tubing joints. Subsequently, the user's ability to create permanent, leak-proof joints with these specialty plastics exceeds the problems associated with more standard polymers such as nylon, polyethylene and polypropylene.

An example of the types of problems associated with creating permanent, leak-proof joints is demonstrated by PEX tubing. There are several methods of manufacturing PEX. The fundamental result is that the molecular chains of polyethylene are cross-linked, resulting in a polymer that shows strength and durability over a wide temperature range. Unfortunately, this strength and durability prevents PEX from exhibiting the chemical and adhesive bonding traits that are common with other polymers. Because of this limitation, a variety of mechanical means for creating joints with PEX tubing have been developed. These means typically include crimping means and metal tubing inserts.

An example of such mechanical means include the Vanguard CRIMPSERT™ metallic insert fitting. The CRIMPSERT™ fitting uses insert fittings and crimp rings made of copper or brass. Using a crimping tool, the user is able to mechanically seal the joint.

Another example of such mechanical sealing means includes the Wirsbo ProPEX® fitting system. The ProPEX® system uses the shaped-memory characteristic of PEX. An expander tool is used to expand an end of the PEX tubing. An insert fitting is inserted into this expanded tubing and the expander tool is then removed. The tubing returns to its original shape, thereby compressing and holding the insert fitting in place.

What is required is a joint forming technique for plastic tubing, especially tubing constructed of specialty plastic polymers, allowing for quick, repeatable and permanent connection of plastic tubing joints.

SUMMARY OF THE INVENTION

The plastic tubing connector of the present invention satisfies the requirements for a connector assembly suitable for high volume commercial and manufacturing settings. The tubing connector makes use of a collet style connector permanently connected to a receiver element providing means to create permanent, leak-proof connections with plastic tubing. The design of the tubing connector insures high levels of reliability and repeatability.

The preferred embodiment includes a connector assembly for use in connecting and sealing plastic tubing with non-tubing assemblies such as a water filter manifold. The connector consists of a receiver, a seal element and a collet. The receiver includes a through bore with one end including a cavity designed to encompass the tubing, seal element and collet when the connecting process is completed. The collet includes angled gripping fingers, which prevent the withdrawal of inserted plastic tubing. The receiver and collet also include interconnecting means that when acted upon by a sonic force cause the receiver and collet to be permanently bonded.

In an alternative embodiment, the connector assembly could make use of a receiver designed for the interconnection of two or more lengths of plastic tubing. Depending on the desired tubing circuit, a receiver could incorporate a through bore in fluid connection with any number of cavities, each cavity capable of accepting the collet and sealing element of the present invention.

In other alternative embodiments, the receiver and collet could be permanently bonded via attachment means other than sonic welding. Examples of such additional attachment means include adhesive bonding means, friction welding and snap-fit locking means. The present invention is a connector for connecting plastic tubing includes a receiver having a captured ring seal, the ring seal for compressively forming a fluid seal when in engagement with the plastic tubing; and a plurality of inward directed angled fingers disposed in the receiver for compressively engaging the tubing, a force being exertable by the fingers on the tubing, the force acting to resist withdrawal of the tubing from engagement with the fingers. The present invention is further a method of connecting.

BRIEF DESCRIPTION OF THE DRAWINGS

FIG. 2 is a sectional view of the plastic tubing;

FIG. 3 is a sectional view of the collet;

FIG. 4 is a sectional view of the receiver;

DETAILED DESCRIPTION OF THE DRAWINGS

Figure 1:
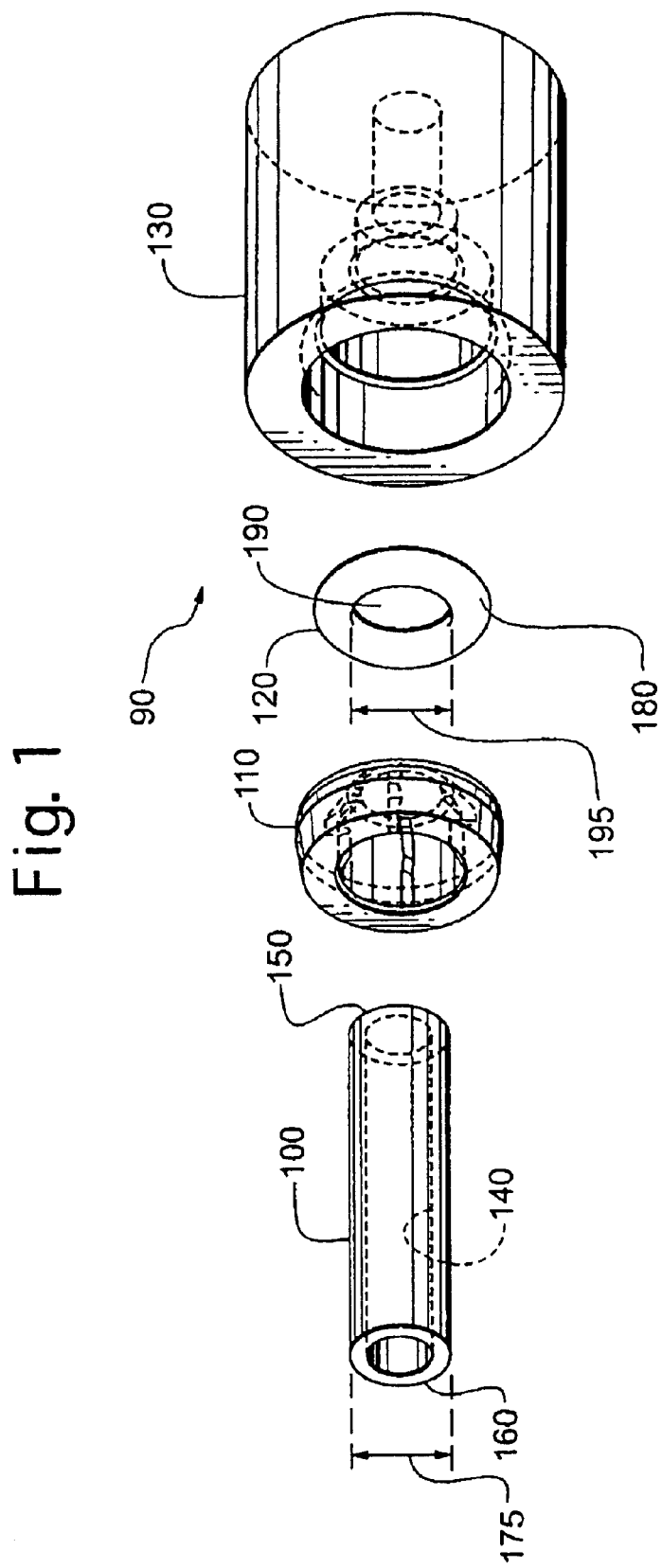
FIG. 1 is an exploded perspective view of the connector assembly of the present invention.

As illustrated by FIGS. 1, 2, 3 and 4, the tubing connector 90 of the current invention comprises collet 110, seal 120 and receiver 130 for connecting a length of plastic tubing 100 to a device.

Tubing 100 contains tube bore 140 defined by proximal end 150 distal end 160, tubing wall 170 and tubing sectional diameter 175.

Seal 120 comprises seal wall 180, seal bore 190, the seal bore 190 having a seal bore diameter 195. Seal 120 is preferably made of a rubber material. The seal wall 180 preferably has a circular cross section. Seal 120 may be a commercially available O-ring seal.

Figure 5:
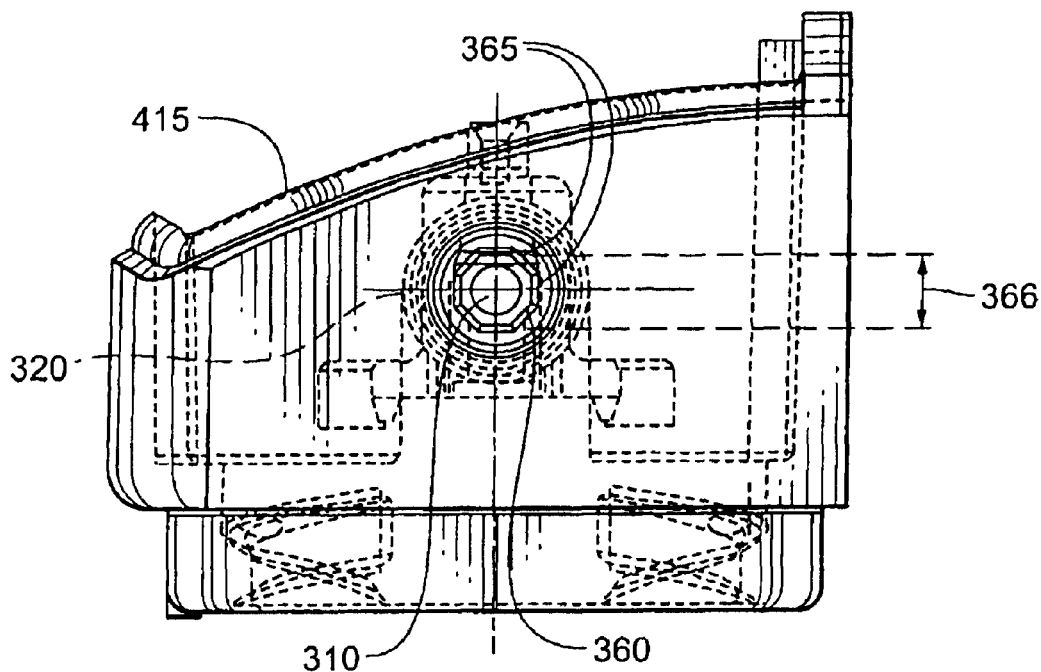
FIG. 5 is an elevational end view of the receiver encompassed within a water filter manifold.
Figure 6:
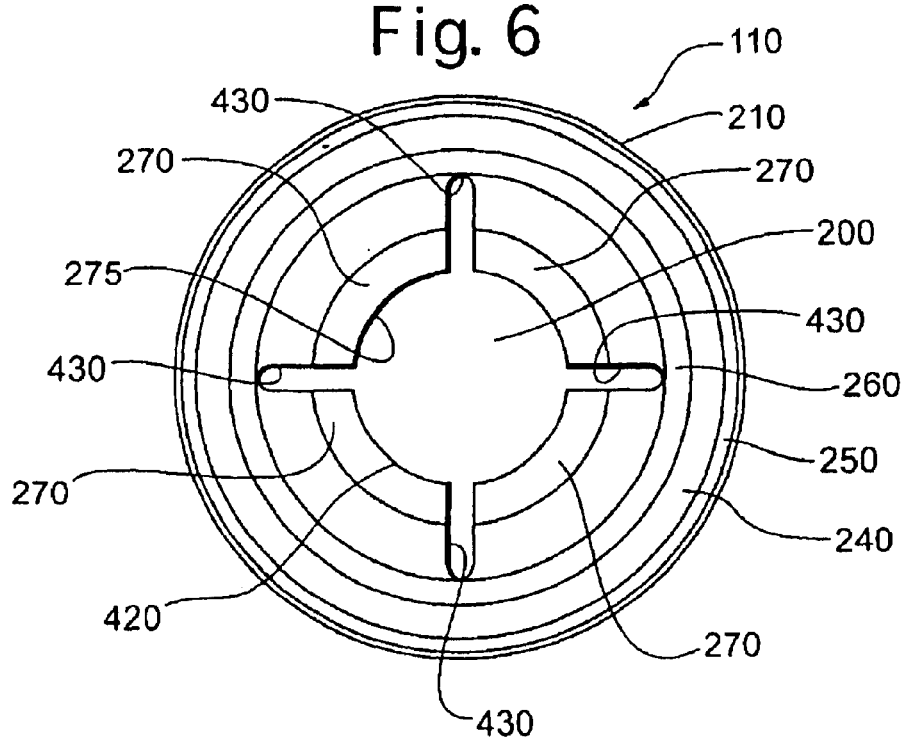
FIG. 6 is an elevational end view of the collet.

Collet 110 comprises collet bore 200 defined by gripping end 210, receiving end 220 and collet wall 230 (see particularly FIGS. 3, 5, and 6). Collet 110 presents a generally cylindrical outer margin. Gripping end 210 contains weld face 240, protrusion 250, exterior grip surface 260 and gripping fingers 270. Gripping fingers 270 taper inward and are defined by grip bore diameter 275. Collet bore 200 contains beveled guide surface 280, alignment surface 290 and interior grip surface 300 presented interior to the gripping fingers 270. Collet 110 is preferably made of a plastic material.

Figure 7:
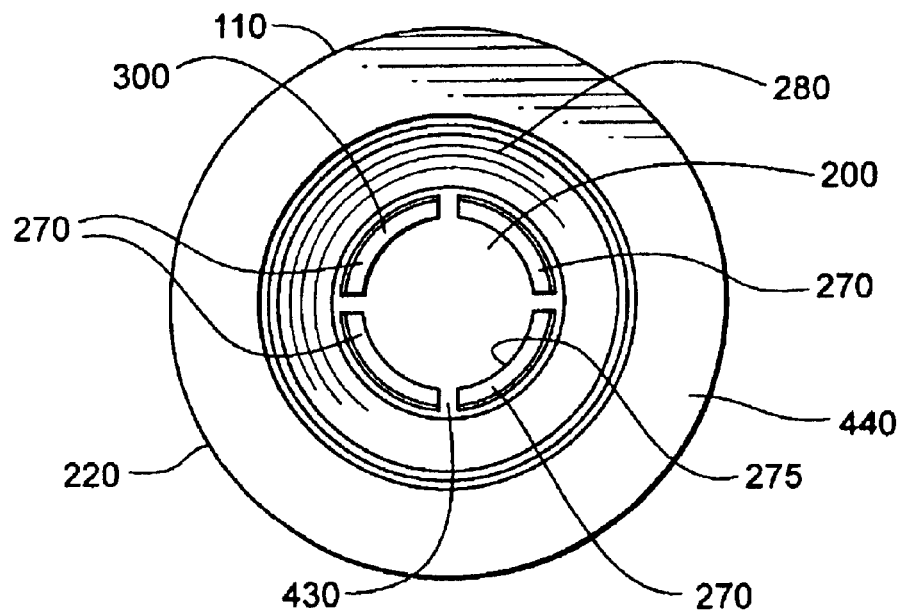
FIG. 7 is an opposed elevational end view of the collet of FIG. 6.

Referring to FIGS. 4 and 7, receiver 130 contains receiver bore 310 defined by receiver face 320, receiver end 330 and receiver body 340. Receiver bore 310 is further defined by tube stop 350, tube interface 360, seal stop 370, seal interface 380, collet stop 390 and collet interface 400. Collet stop 390 contains weld receiver 410.

As depicted in FIG. 5, the receiver 130 may be formed integral with another device such as a manifold 415 for supporting a replaceable filter. When viewing receiver bore 310 from the receiver face 320 end, tube interface 360 can be seen as defining an octagonal surface 365. The interface diameter 366 defined by the octagonal surface 365 of tube interface 360 is slightly oversized as to the standard commercially available tubing sectional diameter 175 of tubing 100. In alternative embodiments, the tube interface 360 can be defined by alternative geometric configurations including but not limited to a hexagonal surface. Two receivers 130 may be formed integrally back-to-back for joining two lengths of tubing.

FIG. 6 contains an end view of the gripping end 210 of collet 110. Collet bore 200 is defined by four gripping fingers 420. Gripping fingers 270 are defined by four equi-angularly spaced and sized notches 430. The circumference 275, formed by the gripping fingers 270, is slightly less than the outside circumference of the tubing 100 to be joined. The gripping fingers 270 are resilient, the diameter 275 being forcibly expandable.

FIG. 7 contains an end view of the receiving end 220 of collet 110. Receiving end 220 is comprised of end wall 440.

Figure 8:
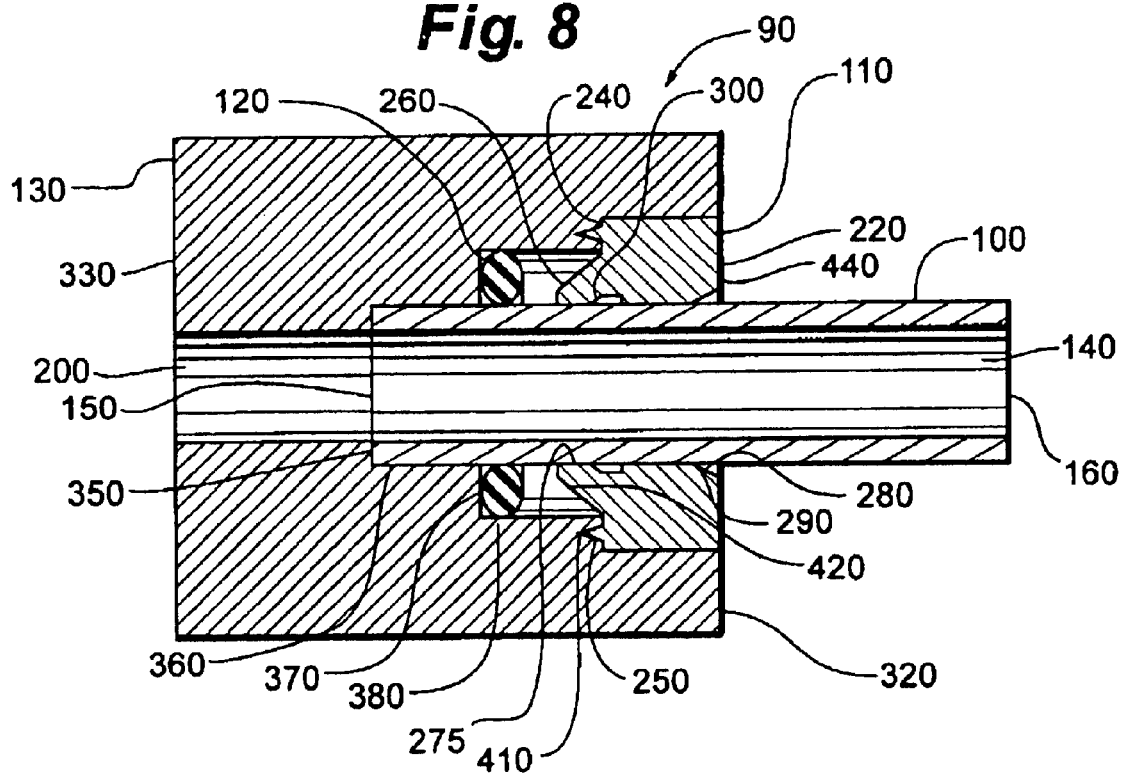
FIG. 8 is a sectional view of the connector assembly.

In practice, the tubing connector 90 of the present invention is formed by permanently connecting the collet 110, seal 120 and receiver 130, as depicted in FIG. 8. Seal 120 is inserted into receiver bore 310 of receiver 130. Seal 120 is inserted until seal wall 180 comes into contact with seal stop 370 of receiver 130. Once seal 120 is in position, collet 110 is inserted into receiver 130 by directing gripping end 210 into receiver bore 310, thereby capturing the seal 120. Collet 110 is inserted until further insertion is prevented through the contact of weld face 240 and collet stop 390. When collet 110 is in a fully inserted position, gripping fingers 270 may be in intimate contact with seal 120. When weld face 240 and collet stop 390 come into contact, protrusion 250 and weld receiver 410 are also in intimate contact.

Once collet 110 is fully inserted, the user directs a sonic force applicator into intimate contact with receiving end 220 of collet 110. The sonic force applicator applies both a compressive force urging the collet 110 into the receiver bore 310 and an ultrasonic force when activated. The user activates the sonic force applicator causing protrusion 250 of collet 110 to melt and flow into weld receiver 410 of receiver 130. If gripping fingers 270 are in physical contact with seal 120, seal 120 will dampen any vibratory effect on the gripping fingers 270 caused by the sonic force applicator. This dampening effect may serve to protect the gripping fingers 270 from potential damage caused through the use of the sonic force applicator. As protrusion 250 melts, the compressive force applied by the sonic force applicator further inserts collet 110 into receiver bore 310 of receiver 130. Collet 110 is inserted until receiving end 220 is flush with receiver face 320 of receiver 130. As sonic force applicator causes the further insertion of collet 110, the exterior grip face 260 of collet 110 may come into contact with seal wall 180 (if not already in contact) resulting in compression of seal 120 between exterior grip face 260 and seal stop 370.

Once receiving end 220 is flush with receiver face 320, the user removes the sonic force applicator. When the sonic force is removed, the melted protrusion 250 cools and hardens within weld receiver 410, resulting in the permanent connection of collet 110 and receiver 130.

Following the permanent connection of collet 110, seal 120 and receiver 130, the user can immediately insert plastic tubing 100 or the connector can be stored and shipped for field installation of the plastic tubing 100. The tubing connector 90 is now in condition to receive tubing 100 in sealing engagement. This sealing engagement is effected by merely inserting the tubing 100 into the connector 90, as is described below.

When the user is prepared to insert plastic tubing 100, the user inserts distal end 150 of plastic tubing 100 into the collet bore 200 located on receiving end 220 of collet 110.

Guide surface 280 of collet 110 directs the distal end 150 into collet bore 200. The user fully inserts plastic tubing 100 until tubing wall 170 of plastic tubing 100 comes into contact with tube stop 350 of receiver 130 as depicted in FIG. 8. During insertion of distal end 150, plastic tubing 100 comes into contact with the interior grip surface 300 of grip finger 270. As tubing sectional diameter 175 exceeds grip bore diameter 275, grip fingers 270 are forced radially outward and thereby apply a compressive force against plastic tubing 100. This force is directional by the fingers being angled toward the distal end 150 of the tubing 100. Accordingly, the compressive force applied by grip finger 270 allows insertion of plastic tubing 100, but acts to prevent withdrawal of plastic tubing 100 once distal end 150 is inserted past grip fingers 270.

When plastic tubing 100 has been fully inserted, octagonal surface 365 of tube interface 360 is in intimate contact with tubing wall 170. As the interface diameter 366 is only slightly oversized as compared to the tubing sectional diameter 175, the octagonal surface 365 prevents side-to-side wobble of plastic tubing 100. By eliminating the side-to-side wobble of plastic tubing 100, the potential for creating leak points is significantly reduced.

During insertion, plastic tubing 100 is also inserted through seal bore 190. As tubing diameter 175 exceeds seal bore diameter 195, insertion of plastic tubing 100 through seal bore 190 results in a further compression of seal 120.

Once plastic tubing 100 has been completely inserted, the completed connector assembly 90 contains a two-level sealing system. The first seal comprises seal 120 compressed between plastic tubing 100, collet 110 and receiver 130. The second seal comprises the permanent weld between collet 110 and receiver 130. In addition, octagonal surface 365 of tube interface 360 eliminates side-to-side wobble of plastic tubing 100, which further promotes the two-level seal integrity.

It will be obvious to those skilled in the art that other embodiments in addition to the ones described herein are indicated to be within the scope and breadth of the present application. Accordingly, the applicant intends to be limited only by the claims appended hereto.

What is claimed is:

1. A connector for connecting plastic tubing, comprising: tubing having a grooveless constant diameter exterior surface; a collet gripping said grooveless constant diameter exterior surface of the tubing, said collet having a plurality of inward directed angled fingers, wherein said angled fingers are configured to grip about the perimeter of the constant diameter exterior surface of the tubing;

a receiver having a bore, the bore having a polygonally shaped portion having at least three contiguous substantially flat sides receiving the tubing and a portion adapted to engage said collet; and a seal sealingly interposed between the collet and the receiver.

2. The connector of claim 1, wherein the flat sides of the polygonally shaped portion of said receiver bore gripping an outer margin portion of the tubing to resist side-to-side wobble of the tubing inserted therein.

3. The connector of claim 1, wherein said collet is fixedly coupled to said receiver.

4. The connector of claim 1, wherein the polygonally shaped portion of said bore is octagonal.

5. A method for connecting grooveless constant diameter plastic tubing to a device, the method comprising:

defining a connector bore in the device, the bore having a polygonally shaped tubing interface portion having at least three contiguous substantially flat sides;

forming a collet having a bore and forming a tubing gripping portion having a plurality of inward directed fingers, and compressively engaging the exterior perimeter surface of the grooveless constant diameter tubing with the plurality of fingers;

inserting a tube end in the tubing interface portion; and gripping a tubing external margin with the flat sides to resist side-to-side wobble of the tube.

6. The method of claim 5, including permanently securing said collet to said device.

7. The method of claim 5, including applying sonic energy to said collet to weld said collet to said device.

8. A connector for connecting substantially cylindrical grooveless constant diameter plastic tubing to a device comprising: tubing having a grooveless constant diameter exterior perimeter surface; a receiver having a bore, the bore having a polygonally shaped portion receiving the tubing, whereby the polygonally shaped portion of said bore acts to resist side-to-side wobble of the substantially cylindrical tubing when the tubing is inserted the polygonally shaped portion; and a collet having a plurality of inward directed teeth gripping said exterior perimeter surface of the grooveless constant diameter tubing.

9. The connector of claim 8, wherein the polygonally shaped portion of said bore is octagonally shaped.

10. A three component connector having a receiver, a collet, and a seal connecting grooveless constant diameter plastic tubing to a comprising:

tubing having a grooveless constant diameter exterior surface, said receiver having a bore formed therethrough receiving the tubing, the bore having tubing interface means for preventing side-to-side wobble of the tubing, and said collet having inward directed tubing gripping means securing and preventing withdrawal of the grooveless constant diameter tubing from the receiver, wherein the tubing interface means comprises a polygonally shaped bore adapted to receive the tubing.

11. The connector of claim 10, wherein the polygonally shaped bore is octagonal.

12. The connector of claim 10, wherein the tubing gripping means comprises a collet having a plurality of inwardly directed angled fingers adapted for compressively engaging the tubing.

13. A connector for sealingly connecting fluid conveying grooveless constant diameter tubing to a device, comprising:

tubing having a grooveless constant diameter exterior surface, a receiver having a bore formed therethrough, the bore having a polygonal tubing interface portion and a tubing gripping portion, the tubing gripping portion having a plurality of inwardly directed angled fingers compressively engaging the tubing;

whereby the polygonally shaped tubing interface portion resists side-to-side wobble of the tubing, and the inwardly directed angled fingers exert a force on the grooveless exterior perimeter surface of the constant diameter tubing acting to resist withdrawal of the tubing from the bore.

14. The connector of claim 13, wherein said insertable collet is non-removable.

15. The connector of claim 13, wherein the tubing interface portion is octagonally shaped.

* * * * *